US011760820B2

(12) United States Patent
Carella et al.

(10) Patent No.: US 11,760,820 B2
(45) Date of Patent: Sep. 19, 2023

(54) FLUORINATED THERMOPLASTIC ELASTOMERS

(71) Applicant: SOLVAY SPECIALTY POLYMERS ITALY S.P.A., Bollate (IT)

(72) Inventors: Serena Carella, Parabiago (IT); Giulio Brinati, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 46 days.

(21) Appl. No.: 16/606,621

(22) PCT Filed: Apr. 16, 2018

(86) PCT No.: PCT/EP2018/059675
§ 371 (c)(1),
(2) Date: Oct. 18, 2019

(87) PCT Pub. No.: WO2018/192878
PCT Pub. Date: Oct. 25, 2018

(65) Prior Publication Data
US 2021/0108011 A1   Apr. 15, 2021

(30) Foreign Application Priority Data

Apr. 18, 2017 (EP) ..................... 17166824

(51) Int. Cl.
| C08F 293/00 | (2006.01) |
| C08L 53/00 | (2006.01) |
| C08F 214/26 | (2006.01) |
| C08F 2/22 | (2006.01) |
| C08F 2/38 | (2006.01) |
| C08F 214/22 | (2006.01) |
| C08F 214/24 | (2006.01) |

(52) U.S. Cl.
CPC .............. *C08F 214/26* (2013.01); *C08F 2/22* (2013.01); *C08F 2/38* (2013.01); *C08F 214/22* (2013.01); *C08F 214/24* (2013.01); *C08F 293/005* (2013.01); *C08L 53/00* (2013.01); *C08L 2203/30* (2013.01)

(58) Field of Classification Search
CPC ... C08F 214/24; C08F 293/00; C08F 293/005
See application file for complete search history.

(56) References Cited

U.S. PATENT DOCUMENTS

| 2,515,628 | A |  | 7/1950 | Castle |
| 2,520,338 | A |  | 8/1950 | Robertson |
| 5,173,553 | A |  | 12/1992 | Albano et al. |
| 5,282,854 | A |  | 2/1994 | Yagi et al. |
| 5,605,971 | A |  | 2/1997 | Arcella et al. |
| 5,612,419 | A |  | 3/1997 | Arcella et al. |
| 5,696,215 | A | * | 12/1997 | Kawashima .......... C08F 259/08 525/276 |
| 6,207,758 | B1 |  | 3/2001 | Brinati et al. |
| 9,834,636 | B2 | * | 12/2017 | Luhmann ............. C09J 151/003 |
| 2009/0202769 | A1 | * | 8/2009 | Masuda ................ F16J 15/102 428/36.92 |
| 2015/0094428 | A1 |  | 4/2015 | Thenappan et al. |

FOREIGN PATENT DOCUMENTS

| EP | 661312 A1 | 7/1995 |
| EP | 1029875 A1 | 8/2000 |
| EP | 1816161 A1 | 8/2007 |
| JP | 2009-256658 A | 11/2009 |

OTHER PUBLICATIONS

Mandelkern, L. et al. Journal of Research of the National Bureau of Standards vol. 58(3) pp. 137-143 (Year: 1957).*
ASTM D3418-08—Standard Test Method for Transition Temperatures and Enthalpies of Fusion and Crystallization of Polymers by Differential Scanning Calorimetry, 2008, 7 pages.
Office Action issued in Japanese Application No. 2019-556367, dated Mar. 29, 2022 (8 pages).

* cited by examiner

*Primary Examiner* — Irina S Zemel
*Assistant Examiner* — Jeffrey S Lenihan
(74) *Attorney, Agent, or Firm* — Osha Bergman Watanabe & Burton LLP

(57) ABSTRACT

The invention pertains to novel fluorinated thermoplastic elastomers, including PCTFE-like plastomeric blocks, contributing substantially to the improvement of sealing performances upon increasing temperature of the fluorinated thermoplastic elastomers comprising the same.

13 Claims, No Drawings

FLUORINATED THERMOPLASTIC ELASTOMERS

CROSS-REFERENCE TO RELATED APPLICATION

This application is a U.S. national stage entry under 35 U.S.C. § 371 of International Application No. PCT/EP2018/059675 filed Apr. 16, 2018, which claims priority to European application No. 17166824.7 filed on Apr. 18, 2017. The entire contents of these applications are explicitly incorporated herein by this reference.

TECHNICAL FIELD

Fluorinated thermoplastic elastomers, i.e. materials combining rubber properties and thermoplastic behaviour, have been provided in the art and are known for being block copolymers consisting of at least one "soft" segment having elastomeric properties and at least one "hard" segment having thermoplastic properties.

It generally understood that while the elastomeric block component is responsible for delivering the rubber-related properties, the thermoplastic segments provides for a sort of reversible crosslinking through the creation of crystalline spherulites, creating interconnections among block-copolymer chains.

As a consequence, these fluorinated thermoplastic elastomers are able to deliver their outstanding performances with no need of further curing, with significant advantages in terms of processing, including re-processing of scraps and losses.

In this area, U.S. Pat. No. 5,605,971 (AUSIMONT SPA) 25 Feb. 1997, U.S. Pat. No. 5,612,419 (AUSIMONT SPA) 18 Mar. 1997, U.S. Pat. No. 6,207,758 (AUSIMONT SPA) 27 Mar. 2001 disclose fluorinated thermoplastic elastomers including plastomeric segment and elastomeric segment, whereas elastomeric segments may be of different types, including e.g. segments including vinylidene fluoride (VDF) recurring units and/or segments including tetrafluoroethylene (TFE) recurring units and whereas plastomeric segment may equally be of different types, such as segments comprising TFE units, segments comprising VDF units, segments comprising ethylene, propylene or isobutylene units, in combination with other units. In particular, in these documents, the segments of plastomeric type may be notably copolymers of TFE or CTFE (40-60 percent) with ethylene, propylene or isobutylene (40-60 percent), optionally containing as third comonomer a $C_3$-$C_8$ (per)fluoroolefin or a PAVE, in amounts from 0.1 to 10 percent, without nevertheless these embodiments being more specifically described in connection with actual examples of materials possessing specific properties.

Now, in highly demanding fields of use, rubbers are called to preserve and maintain their elastomeric behaviour even at high temperatures: generally, both cured traditional fluoroelastomer compounds and even more thermoplastic fluoroelastomer generally suffer from a decrease in sealing performances when temperature is raised.

There is thus still a shortfall in the art for fluorinated thermoplastic elastomers able to deliver improved sealing properties, in particular C-Set values at temperatures as high as 70° C. which are similar or even better than the performances observed at room temperature, combined with improved chemical and barrier properties.

On the other side, PCTFE is a well-known thermoplast, which is widely known for its outstanding barrier properties, and which is generally recognized as an alternative to PTFE, with lower thermal rating, and less chemical resistance, but with significant advantageous properties in terms of mechanical resistance.

Methods for the synthesis of CTFE-based block copolymers through iodine transfer polymerization have been disclosed; US 2015094428 (HONEYWELL INTERNATIONAL INC) Feb. 4, 2015 discloses a method whereas a fluoromonomer "M" is reacted with a iodine-containing chain transfer agent to form a iodine-containing macro-initiator, and CTFE is further polymerized in the presence of said macro-initiator to provide a block copolymer. Exemplary CTFE-based block copolymer formed are selected from the group consisting of:
$C_6F_{13}$-poly(CTFE-co-VDC)-block-PCTFE, $C_6F_{13}$-poly(VDF)-block-PCTFE diblock copolymers,
PCTFE-block-poly(CTFE-co-VDC)-$C_6F_{12}$-poly(CTFE-co-VDC)-block-PCTF E,
PCTFE-block-poly(CTFE-co-VDC)-$C_4F_8$-poly(CTFE-co-VDC)-block-PCTF E, and PCTFE-block-poly(VDF)-$C_4F_8$-poly(VDF)-block-PCTFE triblock copolymers.

EP 1816161 A (DAIKIN INDUSTRIES) 8 Aug. 2007 is directed to a thermoplastic polymer composition comprising a thermoplastic fluororesin, a fluororubber and a fluorinated thermoplastic elastomer.

EP 1029875 A (DAIKIN INDUSTRIES) 23 Aug. 2000 is directed to a molding material comprising a multi-segmented polymer having an elastomeric segment and a non-elastomeric segment. Paragraph [0043] mentions the possibility for the non-elastomeric block to be a PCTFE block.

U.S. Pat. No. 5,282,854 (DAIKIN INDUSTRIES) 1 Feb. 1994 is directed to a fluorine-containing block copolymer comprising at least one soft segment which comprises chlorotrifluoroethylene and vinylidene fluoride and at least one hard segment which comprises a fluorine-containing crystalline polymer, said materials being useful for making artificial lens as eye implants.

EP 0661312 A (AUSIMONT) 5 Jul. 1995 is directed to thermoplastic elastomers comprising monomeric units deriving from certain bis-olefin monomers, and made of elastomeric blocks, which may be selected from VDF- and TFE-based blocks, and plastomeric blocks, which may be notably TFE or CTFE (40-60%) copolymers, with ethylene, propylene or isobutylene (40-60%).

SUMMARY OF INVENTION

The Applicant has now surprisingly found that certain fluorinated thermoplastic elastomers, as below detailed, are such to address and cope the challenging requirements expressed above. Relying on an emulsion polymerization method, the Applicant has been able to provide certain fluorinated thermoplastic elastomers including 'PCTFE'-like plastomeric blocks, which have surprisingly lead to achieving improved sealing properties at temperatures as high as 70° C.

The present invention hence is directed to a fluorinated thermoplastic elastomer [polymer (F-TPE)] comprising:
at least one elastomeric block (A) consisting of a sequence of recurring units, said sequence comprising recurring units derived from at least one fluorinated monomer, said block (A) possessing a glass transition temperature of less than 25° C., as determined according to ASTM D3418, and at least one thermoplastic block (B) consisting of a sequence of recurring units, said sequence consisting essentially of recurring units derived from chlorotrifluoroethylene.

DESCRIPTION OF EMBODIMENTS

The Fluorinated Thermoplastic Elastomer [Polymer (F-TPE)]

For the purpose of the present invention, the term "elastomeric", when used in connection with the "block (A)" is hereby intended to denote a polymer chain segment which, when taken alone, is substantially amorphous, that is to say, has a heat of crystallization of less than 2.0 J/g, preferably of less than 1.5 J/g, more preferably of less than 1.0 J/g, as measured according to ASTM D3418.

For the purpose of the present invention, the term "thermoplastic", when used in connection with the "block (B)", is hereby intended to denote a polymer chain segment which, when taken alone, is semi-crystalline, and possesses a detectable melting point, with an associated heat of crystallization of exceeding 10.0 J/g, as measured according to ASTM D3418.

The fluorinated thermoplastic elastomer of the composition (C) of the invention is advantageously a block copolymer, said block copolymer typically having a structure comprising at least one block (A) alternated to at least one block (B), that is to say that said fluorinated thermoplastic elastomer typically comprises, preferably consists of, one or more repeating structures of type (B)-(A)-(B). Generally, the polymer (F-TPE) has a structure of type (B)-(A)-(B), i.e. comprising a central block (A) having two ends, connected at both ends to a side block (B).

The block (A) is often alternatively referred to as soft block (A); the block (B) is often alternatively referred to as hard block (B).

The term "fluorinated monomer" is hereby intended to denote an ethylenically unsaturated monomer comprising at least one fluorine atom.

The fluorinated monomer may further comprise one or more other halogen atoms (Cl, Br, I), and is advantageously selected from the group consisting of:

(a) $C_2$-$C_8$ perfluoroolefins such as tetrafluoroethylene (TFE), hexafluoropropylene (HFP), perfluoroisobutylene;

(b) hydrogen-containing $C_2$-$C_8$ fluoroolefins, such as vinylidene fluoride (VDF), vinyl fluoride, trifluoroethylene (TrFE), hexafluoroisobutylene (HFIB), perfluoroalkyl ethylenes of formula $CH_2=CH-R_{f1}$, wherein $R_{f1}$ is a $C_1$-$C_6$ perfluoroalkyl group;

(c) $C_2$-$C_8$ chloro- and/or bromo-containing fluoroolefins such as chlorotrifluoroethylene (CTFE);

(d) fluoroalkylvinylethers of formula $CF_2=CFOR_{fa}$, wherein $R_{fa}$ is a $C_1$-$C_6$ fluoroalkyl group, such as $CF_3$, $C_2F_5$ or $C_3F_7$;

(e) fluorooxyalkylvinylethers of formula $CF_2=CFOX_{0a}$, wherein $X_{0a}$ is a $C_1$-$C_{12}$ fluorooxyalkyl group comprising one or more than one ethereal oxygen atom, including notably fluoromethoxyalkylvinylethers of formula $CF_2=CFOCF_2OR_{fb}$, with $R_{fb}$ being a $C_1$-$C_3$ fluoro(oxy)alkyl group, such as $-CF_2CF_3$, $-CF_2CF_2-O-CF_3$ and $-CF_3$; and (f) (per)fluorodioxoles of formula:

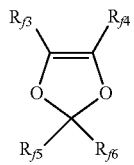

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as $-CF_3$, $-C_2F_5$, $-C_3F_7$, $-OCF_3$ or $-OCF_2CF_2OCF_3$.

Block(s) (A) may further comprise recurring units derived from at least one hydrogenated monomer, wherein the term "hydrogenated monomer" is intended to denote an ethylenically unsaturated monomer comprising at least one hydrogen atom and free from fluorine atoms. Hydrogenated monomers, as above detailed, include notably ethylene, propylene, (meth)acrylic monomers, styrenic monomers.

The polymer (F-TPE) typically comprises, preferably consists of:

at least one elastomeric block (A) selected from the group consisting of:

(1) vinylidene fluoride (VDF)-based elastomeric blocks ($A_{VDF}$) consisting of a sequence of recurring units, said sequence comprising recurring units derived from VDF and recurring units derived from at least one fluorinated monomer different from VDF, said fluorinated monomer different from VDF being typically selected from the group consisting of:

(a) $C_2$-$C_8$ perfluoroolefins such as tetrafluoroethylene (TFE), hexafluoropropylene (HFP);

(b) hydrogen-containing $C_2$-$C_8$ fluoroolefins different from VDF, such as vinyl fluoride, trifluoroethylene (TrFE), hexafluoroisobutylene (HFIB), perfluoroalkyl ethylenes of formula $CH_2=CH-R_{f1}$, wherein $R_{f1}$ is a $C_1$-$C_6$ perfluoroalkyl group;

(c) $C_2$-$C_8$ chloro- and/or bromo-containing fluoroolefins such as chlorotrifluoroethylene (CTFE);

(d) perfluoroalkylvinylethers (PAVE) of formula $CF_2=CFOR_{f1}$, wherein $R_{f1}$ is a $C_1$-$C_6$ perfluoroalkyl group, such as $CF_3$ (PMVE), $C_2F_5$ or $C_3F_7$;

(e) perfluorooxyalkylvinylethers of formula $CF_2=CFOX_0$, wherein $X_0$ is a $C_1$-$C_{12}$ perfluorooxyalkyl group comprising one or more than one ethereal oxygen atom, including notably perfluoromethoxyalkylvinylethers of formula $CF_2=CFOCF_2OR_{f2}$, with $R_{f2}$ being a $C_1$-$C_3$ perfluoro(oxy)alkyl group, such as $-CF_2CF_3$, $-CF_2CF_2-O-CF_3$ and $-CF_3$; and (f) (per)fluorodioxoles of formula:

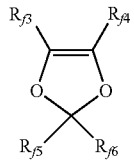

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as $-CF_3$, $-C_2F_5$, $-C_3F_7$, $-OCF_3$ or $-OCF_2CF_2OCF_3$; and (2) tetrafluoroethylene (TFE)-based elastomeric blocks ($A_{TFE}$) consisting of a sequence of recurring units, said sequence comprising recurring units derived from TFE and recurring units derived from at least one fluorinated monomer different from TFE, said fluorinated monomer being typically selected from the group consisting of those of classes (b), (c), (d), (e) as defined above;
- at least one thermoplastic block (B) consisting of a sequence of recurring units, said sequence consisting essentially of recurring units derived from chlorotrifluoroethylene.

Any of block(s) ($A_{VDF}$) and ($A_{TFE}$) may further comprise recurring units derived from at least one hydrogenated monomer, which may be selected from the group consisting of $C_2$-$C_8$ non-fluorinated olefins such as ethylene, propylene or isobutylene.

Should the elastomeric block (A) be a block ($A_{VDF}$), as above detailed, said block ($A_{VDF}$) typically consists of a sequence of recurring units comprising, preferably consisting of:
- from 45% to 90% by moles of recurring units derived from vinylidene fluoride (VDF),
- from 5% to 50% by moles of recurring units derived from at least one fluorinated monomer different from VDF, and
- optionally, up to 30% by moles of recurring units derived from at least one hydrogenated monomer, with respect to the total moles of recurring units of the sequence of block ($A_{VDF}$).

The elastomeric block (A) may further comprise recurring units derived from at least one bis-olefin [bis-olefin (OF)] of formula:

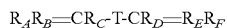

$$R_A R_B=CR_C\text{-}T\text{-}CR_D=R_E R_F$$

wherein $R_A$, $R_B$, $R_C$, $R_D$, $R_E$ and $R_F$, equal to or different from each other, are selected from the group consisting of H, F, Cl, $C_1$-$C_5$ alkyl groups and $C_1$-$C_5$ (per)fluoroalkyl groups, and T is a linear or branched $C_1$-$C_{18}$ alkylene or cycloalkylene group, optionally comprising one or more than one ethereal oxygen atom, preferably at least partially fluorinated, or a (per)fluoropolyoxyalkylene group.

The bis-olefin (OF) is preferably selected from the group consisting of those of any of formulae (OF-1), (OF-2) and (OF-3):

(OF-1)

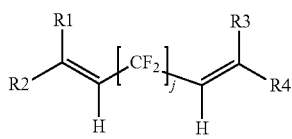

wherein j is an integer comprised between 2 and 10, preferably between 4 and 8, and R1, R2, R3 and R4, equal to or different from each other, are selected from the group consisting of H, F, $C_1$-$C_5$ alkyl groups and $C_1$-$C_5$ (per)fluoroalkyl groups;

(OF-2)

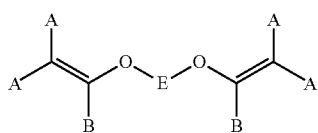

wherein each of A, equal to or different from each other and at each occurrence, is independently selected from the group consisting of H, F and Cl; each of B, equal to or different from each other and at each occurrence, is independently selected from the group consisting of H, F, Cl and OR$_B$, wherein R$_B$ is a branched or straight chain alkyl group which may be partially, substantially or completely fluorinated or chlorinated, E is a divalent group having 2 to 10 carbon atoms, optionally fluorinated, which may be inserted with ether linkages; preferably E is a —$(CF_2)_m$— group, wherein m is an integer comprised between 3 and 5; a preferred bis-olefin of (OF-2) type is $F_2C=CF-O-(CF_2)_5-O-CF=CF_2$;

(OF-3)

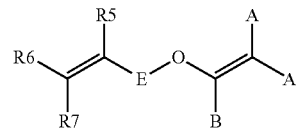

wherein E, A and B have the same meaning as defined above, R5, R6 and R7, equal to or different from each other, are selected from the group consisting of H, F, $C_1$-$C_5$ alkyl groups and $C_1$-$C_5$ (per)fluoroalkyl groups.

Should the block (A) consist of a recurring units sequence further comprising recurring units derived from at least one bis-olefin (OF), said sequence typically comprises recurring units derived from the said at least one bis-olefin (OF) in an amount comprised between 0.01% and 1.0% by moles, preferably between 0.03% and 0.5% by moles, more preferably between 0.05% and 0.2% by moles, based on the total moles of recurring units of block (A).

The expression "minor amount" when used hereunder for indicating the amount of recurring units derived from a bis-olefin in a block (A) of polymer (F-TPE) is intended to denote an amount which is one order of magnitude less (e.g. at least 50 times less) than the amount of recurring units derived from the other monomers, i.e. TFE and the perfluorinated monomer other than TFE, so as not to significantly affect the typical thermal stability and chemical resistance performances due to these latter units.

Should the elastomeric block (A) of polymer (F-TPE) further comprise recurring units derived from at least one bis-olefin (OF), said block (A) typically further comprises recurring units derived from at least one bis-olefin (OF) in an amount comprised between 0.01% and 1.0% by moles, preferably between 0.03% and 0.5% by moles, more preferably between 0.05% and 0.2% by moles, based on the total moles of recurring units constituting said elastomeric block (A).

As said, block (B) of polymer (F-TPE) consists of a sequence of recurring units, said sequence essentially consisting of recurring units derived from chlorotrifluoroethylene.

End chains, defects or minor amounts of monomer impurities (<1% moles) leading to recurring units different from those above mentioned can be still comprised in the preferred block(s) (B), without this affecting properties of the polymer (F-TPE).

Hence, block (B) of polymer (F-TPE) advantageously consists of a sequence of recurring units, said sequence essentially consisting of at least 99% moles of recurring units derived from chlorotrifluoroethylene, with respect to the total number of moles of recurring units of block (B).

This being said, embodiments wherein block (B) of polymer (F-TPE) consists of a sequence of recurring units, said sequence consisting of recurring units derived solely from chlorotrifluoroethylene are within the scope of the present invention.

As said, the polymer (F-TPE) possesses a melting point ($T_m$) of at least 180° C., preferably of at least 190° C., wherein $T_m$ is determined according to ASTM D3418. Yet, it is preferably for the polymer (F-TPE) to possess a melting point ($T_m$) of at most 225° C., preferably at most 220° C., more preferably at most 215° C.

Further, the polymer (F-TPE) of the present invention possesses a heat of crystallization ($\Delta H_{XX}$) respecting the following inequality:

$$2.5 \text{ J/g} < \Delta H_{XX} < F_{(B)} \cdot 45.0 \text{ J/g}$$

preferably respecting the following inequality:

$$3.0 \text{ J/g} < \Delta H_{XX} < F_{(B)} \cdot 40.0 \text{ J/g}.$$

The weight ratio between blocks (A) and blocks (B) in the fluorinated thermoplastic elastomer is typically comprised between 95:5 and 10:90, i.e. $F_{(B)}$ values ranging from 0.05 to 0.90.

According to certain preferred embodiments, the polymers (F-TPE) comprise blocks (A) in amounts such that the $F_{(A)}$ (which is $Wt_{(A)}/[Wt_{(A)}+Wt_{(B)}]$) is comprised between 0.5 and 0.85; according to these embodiment's, the polymer (F-TPE) used in the method of the present invention is characterized by a weight ratio between blocks (A) and blocks (B) of 50:50 to 85:15.

The polymers (F-TPE) used in the method of the present invention may be manufactured by a manufacturing process comprising the following sequential steps:
(a) emulsion-polymerizing at least one fluorinated monomer, and possibly at least one bis-olefin (OF), in an aqueous medium in the presence of a radical initiator and of an iodinated chain transfer agent, thereby providing a pre-polymer consisting of at least one block (A) containing one or more iodinated end groups dispersed in an aqueous medium; and
(b) emulsion-polymerizing chlorotrifluoroethylene (CTFE), in the presence of a radical initiator and in the presence of the pre-polymer dispersed in the said aqueous medium as obtained from step (a), thereby providing at least one block (B) grafted on said pre-polymer through reaction of the said iodinated end groups of the block (A).

The radical initiator is typically selected from the group consisting of:
  inorganic peroxides such as, for instance, alkali metal or ammonium persulphates, perphosphates, perborates or percarbonates, optionally in combination with ferrous, cuprous or silver salts or other easily oxidable metals;
  organic peroxides such as, for instance, disuccinylperoxide, tertbutyl-hydroperoxide, and ditertbutylperoxide; and
  azo compounds (see, for instance, U.S. Pat. No. 2,515,628 (E. I. DU PONT DE NEMOURS AND CO.) Jul. 18, 1950 and U.S. Pat. No. 2,520,338 (E. I. DU PONT DE NEMOURS AND CO.) Aug. 29, 1950).

It is also possible to use organic or inorganic redox systems, such as persulphate ammonium/sodium sulphite, hydrogen peroxide/aminoiminomethansulphinic acid.

In step (a) and/or (b) of the manufacturing method as above detailed, one or more iodinated chain transfer agents are added to the reaction medium, typically of formula $R_xI_n$, wherein $R_x$ is a $C_1$-$C_{16}$, preferably a $C_1$-$C_8$ (per)fluoroalkyl or a (per)fluorochloroalkyl group, and n is 1 or 2. It is also possible to use as chain transfer agents alkali or alkaline-earth metal iodides, as described in U.S. Pat. No. 5,173,553 (AUSIMONT S.P.A.) Dec. 22, 1992. The amount of the chain transfer agent to be added is established depending on the molecular weight which is intended to be obtained and on the effectiveness of the chain transfer agent itself.

In any of steps (a) and (b) of the manufacturing method as above detailed, one or more surfactants may be used, preferably fluorinated surfactants of formula:

$$R_y\text{—}X^-M^+$$

wherein $R_y$ is a $C_5$-$C_{16}$ (per)fluoroalkyl or a (per)fluoropolyoxyalkyl group, $X^-$ is —COO⁻ or —SO₃⁻, and $M^+$ is selected from the group consisting of $H^+$, $NH_4^+$, and an alkali metal ion.

Among the most commonly used surfactants, mention can be made of (per)fluoropolyoxyalkylenes terminated with one or more carboxyl groups can be used.

In the manufacturing process, when step (a) is terminated, the reaction is generally discontinued, for instance by cooling, and the residual monomers are removed, for instance by heating the emulsion under stirring. The second polymerization step (b) is then advantageously carried out, feeding the ethylene/chlorotrifluoroethylene-containing monomer(s) mixture and adding fresh radical initiator. If necessary, under step (b) of the process for the manufacture of the polymer (F-TPE), one or more further chain transfer agents may be added, which can be selected from the same iodinated chain transfer agents as defined above or from chain transfer agents known in the art for use in the manufacture of fluoropolymers such as, for instance, ketones, esters or aliphatic alcohols having from 3 to 10 carbon atoms, such as acetone, ethylacetate, diethylmalonate, diethylether and isopropyl alcohol; hydrocarbons, such as methane, ethane and butane; chloro(fluoro)carbons, optionally containing hydrogen atoms, such as chloroform and trichlorofluoromethane; bis(alkyl)carbonates wherein the alkyl group has from 1 to 5 carbon atoms, such as bis(ethyl) carbonate and bis (isobutyl) carbonate. When step (b) is completed, the polymer (F-TPE) is generally isolated from the emulsion according to conventional methods, such as by coagulation by addition of electrolytes or by cooling.

The polymerization temperature and pressure can vary within wide ranges depending on the type of monomers used and based on the other reaction conditions. Step (a) and/or step (b) of process for the manufacture of the polymer (F-TPE) is typically carried out at a temperature of from −20° C. to 150° C.; and/or typically under pressures up to 10 MPa.

The polymer (F-TPE) of the present invention can be compounded with various additives, adjuvants and modifying agents, as required depending upon field of use.

Still another object of the present invention is hence a composition (C) comprising the polymer (F-TPE) of the present invention in combination with at least one additional component, which is advantageously selected from the group consisting of reinforcing agents, pigments, processing aids, plasticizers, stabilizers (including thermal stabilizers, UV stabilizers), acid scavengers, mould release agents, and curing systems.

While the use of a curing system is not mandatory, according to certain embodiments, it may be appropriate including an agent able to promote cross-linking of the polymer (F-TPE), so as to further improve performances of the cured part obtained therefrom. In such case, usual curing systems which have been found appropriate for promoting cross-linking of elastomeric block (A) or of thermoplastic block (B) may be added.

The polymer (F-TPE) or a composition (C) comprising the same can be processed through usual thermoplastic techniques so as to provide shaped articles.

A further object of the present invention is hence a method for manufacturing a shaped article, said method comprising moulding polymer (F-TPE) or composition (C) as above detailed so as to provide said shaped article.

Technique used for moulding is not particularly limited; standard techniques including shaping polymer (F-TPE) or composition (C) in a molten/softened form can be advantageously applied, and include notably compression moulding, extrusion moulding, injection moulding, transfer moulding and the like.

It is nevertheless generally understood that especially when said shape article possesses a complex design, injection moulding technique is the most versatile, and extensively used.

According to this technique, a ram or screw-type plunger is used for forcing a portion of polymer (F-TPE) or composition (C) in its molten state into a mould cavity, wherein the same solidified into a shape that has confirmed to the contour of the mould. Then, the mould opens and suitable means (e.g. an array of pins, sleeves, strippers, etc.) are driven forward to demould the article. Then, the mould closes and the process is repeated.

In another embodiment of the present invention, the method for manufacturing a shaped article includes a step of machining a standard shaped part so as to obtain the targeted shaped article having different size and shape from said standard shaped part. Non limiting examples of said standard shaped parts include notably a plate, a rod, a slab and the like. Said standard shaped parts can be obtained by any processing technique, including notably extrusion or injection moulding of the polymer (F-TPE) or composition (C).

The shaped articles made from polymer (F-TPE) or composition (C) can be notably useful as sealing materials.

Non-limiting examples of shaped articles of the invention useful as sealing material are notably an O- or square-ring, packing, gasket, diaphragm and other sealing materials in the semiconductor-related fields such as semiconductor manufacturing equipment, liquid crystal panel manufacturing equipment, plasma panel manufacturing equipment, plasma address liquid crystal panel, field emission display panel, and solar cell substrate, and these can be used on CVD equipment, dry etching equipment, wet etching equipment, oxidation and diffusion equipment, sputtering equipment, ashing equipment, cleaning equipment, ion implantation equipment and exhaust equipment. Concretely these can be used as O-ring and sealing material for a gate valve, as O-ring and other sealing materials for a quartz window, as O-ring and other sealing materials for a chamber, as O-ring and other sealing materials for a gate, as O-ring and other sealing materials for a bell jar, as O-ring and other sealing materials for a coupling, as O-ring, diaphragm and other sealing materials for a pump, as O-ring and other sealing materials for a gas control equipment for semiconductor, and as O-ring and other sealing materials for a resist developing solution and releasing solution.

In the field of automobile, the shaped articles of the invention can be used as a gasket, shaft seal, valve stem seal, piston ring, crank shaft seal, cam shaft seal, oil seal and various sealing materials for engine and its peripheral equipment and various sealing materials for driving equipment. Examples of sealing materials to be used on a fuel system and its peripheral equipment are O- or square-ring, packing and diaphragm. Concretely there can be used as engine head gasket, metal gasket, oil pan gasket, crank shaft seal, cam shaft seal, valve stem seal, manifold packing, seal for oxygen sensor, injector O-ring, injector packing, fuel pump O-ring, diaphragm, crank shaft seal, gear box seal, power piston packing, cylinder liner seal, valve stem seal, front pump seal of automatic transmission gear, rear axle pinion seal, universal joint gasket, speed meter pinion seal, foot brake piston cup, O-ring of torque transmission, oil seal, seal of exhaust gas recirculation combustion equipment, bearing seal, and diaphragm for carburettor sensor.

In the fields of aviation, shaped articles of the invention can be diaphragm, O- or square-ring, valve, packing and various sealing materials, and these can be used on a fuel system. Concretely in the field of aviation, there are jet engine valve stem seal, gasket, O-ring, rotating shaft seal, gasket for hydraulic equipment and fire wall seal, and in the field of ship, propeller shaft stern seal of screw, valve stem seal for suction and exhaust of diesel engine, butterfly valve seal and butterfly valve shaft seal.

In the field of chemical processing, shaped articles of the invention can be valve, packing diaphragm, O- or square-ring, and various sealing materials, and these can be used for processes for preparing chemicals such as pharmaceuticals, agricultural chemicals, coatings and resins. Concretely there can be used for pump for chemicals, seal of flow meter and piping, seal for heat exchanger, packing for glass cooler of sulfuric acid manufacturing equipment, seal of agricultural chemicals sprinkler and transfer pump, seal of gas piping, seal for plating solution, packing for high temperature dryer, belt roll seal for paper making, seal of fuel cell, duct joint seal, gas chromatography, packing for tube joint of pH meter, seal of analyzer and physical and chemical apparatuses, diaphragm, valve parts and the like.

For developing machines in the field of photograph, for printing machines in the field of printing and for coating facilities in the field of coating, the shaped articles of the invention can be used as seal and valve parts of dry copying machine.

In the field of food processing equipments, shaped articles of the invention can be a valve, packing, diaphragm, O- or square-ring, and various sealing materials which can be used in food producing process. Concretely the shaped articles of the invention can be used as seal of plate type heat exchanger and solenoid valve seal of vending machine.

In the field of equipment for nuclear power plant, shaped articles of the invention can be a packing, O-ring, diaphragm, valve and various sealing materials.

In the field of general purpose industry equipments, shaped articles of the invention can be a packing, O-ring, diaphragm, valve and various sealing materials. More specifically, shaped articles of the invention can be used for seal of hydraulic and lubricating machine, bearing seal, window and other seals of dry cleaner, seal of uranium hexafluoride concentrator, seal (vacuum) valve of cyclotron, seal of automatic packaging machine, and diaphragm of pump for analyzing sulfur dioxide and chlorine gas in the air (pollution control equipment).

In the field of use of electric devices, shaped articles of the invention can be used as a venting seal for an insulating oil cap and liquid seal transformer, e.g. for high speed trains.

In the domain of fuel cells, shaped articles of the invention can be used as a sealing material between the electrode and the separator, seals for hydrogen, oxygen and produced water piping and packings to be used between the fuel cell electrodes and for peripheral pipes thereof.

In the field of electronic parts, shaped articles of the invention can be used as a heat-releasing material, electromagnetic wave shielding material and gasket for hard disc drive of computer.

Also, the shaped articles of the invention can be can be used especially suitably as sealing materials for clean facilities such as gasket for magnetic recorder (hard disc drive) and seal ring materials for semiconductor manufacturing equipment and device storage for wafer.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Example 1: Block Copolymer Having Structure PCTFE-P(VDF-HFP)-PCTFE (60/40)

Step 1: In a 22 liters reactor equipped with a mechanical stirrer operating at 460 rpm, 13.5 l of demineralized water and 54 ml of a microemulsion, previously obtained by mixing 12.0 ml of a perfluoropolyoxyalkylene having acidic end groups of formula: $CF_2ClO(CF_2-CF(CF_3)O)_n(CF_2O)_mCF_2OOOH$, wherein n/m=10, having an average molecular weight of 600, 7.5 ml of a 30% v/v $NH_4OH$ aqueous solution, 27.0 ml of demineralized water and 7.5 ml of GALDEN® D02 perfluoropolyether of formula $CF_3O(CF_2CF(CF_3)O)_n(CF_2O)_mCF_3$, wherein n/m=20, having an average molecular weight of 450, were introduced.

The reactor was heated and maintained at a set-point temperature of 80° C.; a mixture of vinylidene fluoride (VDF) (78.5% moles) and hexafluoropropylene (HFP) (21.5% moles) was then added to reach a final pressure of 25 bar. Then, 20 g of 1,4-diiodoperfluorobutane (C4F8I2) as chain transfer agent were introduced, and 3.0 g of ammonium persulfate (APS) as initiator were introduced. Pressure was maintained at a set-point of 25 bar by continuous feeding of a gaseous mixture of vinylidene fluoride (VDF) (78.5% by moles) and hexafluoropropylene (HFP) (21.5% by moles) up to a total of 4800 g.

Once 4800 g of monomer mixture were fed to the reactor, the reaction was discontinued by cooling the reactor to room temperature. The residual pressure was let to fall down up while keeping the reaction temperature constant, then, the reactor was cooled, vented and the latex recovered. The aqueous latex so obtained had a solid content of 27% by weight.

Step 2: In an 18 liters enamelled reactor equipped with baffles and mechanical stirrer operating at 600 rpm, 8 Kg of the aqueous latex obtained in the Step 1, 2 L of demineralized water and 1.5 Kg of chlorotrifluoroethylene were introduced. Then, the temperature was brought to 75° C. and the pressure registered was 17.40 absolute bars. Once temperature and pressure were constant, 3 g of ammonium persulfate (APS) as initiator were introduced. Pressure started to decrease down to a total DeltaP of 14 bar, to reach a final pressure of 3.4 absolute bars; the reactor was then cooled, vented and the latex recovered. The latex was treated with sodium sulphate, and coagulated crumbs were separated from the aqueous phase, washed with demineralized water and dried in a convection oven at 60° C. for 16 hours.

Characterization data of the polymer so obtained are summarized in Table 1.

Example 2: Block Copolymer Having Structure PCTFE-P(VDF-HFP)-PCTFE (50/50)

Same procedure as in Ex. 1 was followed, except that in the second step 1.7 Kg of chlorotrifluoroethylene were introduced. The starting pressure in Step 2, once the temperature was brought to 75° C., was 18.02 absolute bars. Once temperature and pressure were constant, 4 g of ammonium persulfate (APS) as initiator were introduced. Pressure decreased down to a total Delta P of 15 bar to reach a final pressure of 3.02 absolute bars. Characterization data of the polymer so obtained are summarized in Table 1.

Example 3: Block Copolymer Having Structure PCTFE-P(VDF-HFP)-PCTFE (85/15)

Same procedure as in Ex. 1 was followed, except that in the second step 0.8 kg of chlorotrifluoroethylene were introduced. The starting pressure in Step 2, once temperature was brought to 75° C., was 8.05 absolute bars. Once temperature and pressure were constant, 4 g of ammonium persulfate (APS) as initiator were introduced. Pressure decreased down to a total Delta P of 6 bar to reach a final pressure of 2.05 absolute bars.

Characterization data of the polymer so obtained are summarized in Table 1.

Example 4: Block Copolymer Having Structure PCTFE-P(VDF-HFP)-PCTFE (80/20)

Same procedure as in Ex. 1 was followed, except that in the second step 0.8 kg of chlorotrifluoroethylene were introduced. The starting pressure in Step 2, once temperature was brought to 7500, was 10.74 absolute bars. Once temperature and pressure were constant, 4.5 g of ammonium persulfate (APS) as initiator were introduced. Pressure decreased down to a total Delta P of 7.7 bar to reach a final pressure of 3.04 absolute bars. Characterization data of the polymer so obtained are summarized in Table 1.

TABLE 1

|  |  | Ex. 1 | | Ex. 2 | | Ex. 3 | | Ex. 4 | |
| --- | --- | --- | --- | --- | --- | --- | --- | --- | --- |
| DCS | | | | | | | | | |
| $T_g$ | [° C.] | −21 | | −21 | | −20.5 | | −19.9 | |
| $T_m$ | [° C.] | 207.0 | | 206.5 | | 201.0 | | 205.3 | |
| $\Delta H_{XX}$ | [J/g] | 9.4 | | 13.1 | | 3.5 | | 5.4 | |
| Composition - NMR | | (A) | $F_{(A)}$ | (A) | $F_{(A)}$ | (A) | $F_{(A)}$ | (A) | $F_{(A)}$ |
| VDF | [% mol] | 78.5 | 0.60 | 78.5 | 0.50 | 78.5 | 0.85 | 78.5 | 0.80 |
| HFP | [% mol] | 21.5 | | 21.5 | | 21.5 | | 21.5 | |

TABLE 1-continued

|  |  | Ex. 1 | | Ex. 2 | | Ex. 3 | | Ex. 4 | |
|---|---|---|---|---|---|---|---|---|---|
| Composition | | (B) | $F_{(B)}$ | (B) | $F_{(B)}$ | (B) | $F_{(B)}$ | (B) | $F_{(B)}$ |
| CTFE | [% mol] | 100 | 0.40 | 100 | 0.50 | 100 | 0.15 | 100 | 0.20 |
| Mechanical Properties | | | | | | | | | |
| TS | [MPA] | 1.3 | | 2.3 | | 0.9 | | 0.9 | |
| $M_{50}$ | [MPA] | 1.3 | | 1.6 | | 0.8 | | 0.8 | |
| $M_{100}$ | [MPA] | 1.2 | | — | | 0.8 | | 0.9 | |
| $E_b$ | [%] | 200 | | 67 | | 218 | | 285 | |
| HD | [Sh A] | 57 | | 82 | | 43 | | 46 | |
| Sealing Properties | | | | | | | | | |
| C-set @ 23° C. | % 24 h | 40.0 | | 49.6 | | 91.0 | | 91.0 | |
| C-set @ 70° C. | % 24 h | 38.3 | | 47.0 | | 72.0 | | 66.0 | |

Comparative Example 5: Block Copolymer Having Structure ECTFE-P(VDF-HFP)-ECTFE

Step 1: In a 22 litres reactor equipped with a mechanical stirrer operating at 460 rpm, 13.5 l of demineralized water and 54 ml of a micro-emulsion, previously obtained by mixing 12.0 ml of a perfluoropolyoxyalkylene having acidic end groups of formula $CF_2ClO(CF_2$—$CF(CF_3)O)_n$ $(CF_2O)_mCF_2OOOH$, wherein n/m=10, having an average molecular weight of 600, 7.5 ml of a 30% v/v $NH_4OH$ aqueous solution, 27.0 ml of demineralized water and 7.5 ml of GALDEN® D02 perfluoropolyether of formula $CF_3O$ $(CF_2CF(CF_3)O)_n(CF_2O)_mCF_3$, wherein n/m=20, having an average molecular weight of 450, were introduced.

The reactor was heated and maintained at a set-point temperature of 80° C.; a mixture of vinylidene fluoride (VDF) (78.5% moles) and hexafluoropropylene (HFP) (21.5% moles) was then added to reach a final pressure of 25 bar. Then, 20 g of 1,4-diiodoperfluorobutane ($C_4F_8I_2$) as chain transfer agent were introduced, and 3.0 g of ammonium persulfate (APS) as initiator were introduced. Pressure was maintained at a set-point of 25 bar by continuous feeding of a gaseous mixture of vinylidene fluoride (VDF) (78.5% by moles) and hexafluoropropylene (HFP) (21.5% by moles) up to a total of 4800 g.

Once 4800 g of monomer mixture were fed to the reactor, the reaction was discontinued by cooling the reactor to room temperature. The residual pressure fell down while keeping the reaction temperature constant, then, the reactor was cooled, vented and the latex recovered.

The aqueous latex so obtained had a solid content of 27% by weight.

Step 2:

In an 18 litres enamelled reactor equipped with baffles and mechanical stirrer operating at 600 rpm, 8 kg of the aqueous latex obtained in the Step 1, 2 l of demineralized water and 1 kg of chlorotrifluoroethylene were introduced. Then, the temperature was brought to 75° C. and ethylene was fed up to a pressure of 21 absolute bars and 2.5 g of ammonium persulfate (APS) as initiator were introduced. Pressure was maintained at a set-point of 21 bar by continuous feeding of ethylene up to a total of 110 g. Then, the reactor was cooled, vented and the latex recovered. The latex was treated with sodium sulphate to effect coagulation, and the solid coagulate so formed was separated from the aqueous phase, washed with demineralized water and dried in a convection oven at 60° C. for 16 hours. Characterization data of the polymer so obtained are summarized in Table 1.

Comparative Example 6: Block Copolymer Having Structure PVDF-P(VDF-HFP)-PVDF (P(VDF-HFP) VDF: 78.5% by Moles, HFP: 21.5% by Moles)

In a 7.5 liters reactor equipped with a mechanical stirrer operating at 72 rpm, 4.5 l of demineralized water and 22 ml of a micro-emulsion, previously obtained by mixing 4.8 ml of a perfluoropolyoxyalkylene having acidic end groups of formula $CF_2ClO(CF_2$—$CF(CF_3)O)_n(CF_2O)_mCF_2COOH$, wherein n/m=10, having an average molecular weight of 600, 3.1 ml of a 30% v/v $NH_4OH$ aqueous solution, 11.0 ml of demineralized water and 3.0 ml of GALDEN® D02 perfluoropolyether of formula $CF_3O(CF_2CF(CF_3)O)_n$ $(CF_2O)_mCF_3$, wherein n/m=20, having an average molecular weight of 450, were introduced.

The reactor was heated and maintained at a set-point temperature of 85° C.; a mixture of vinylidene fluoride (VDF) (78.5% moles) and hexafluoropropylene (HFP) (21.5% moles) was then added to reach a final pressure of 20 bar. Then, 8 g of 1,4-diiodoperfluorobutane ($C_4F_8I_2$) as chain transfer agent were introduced, and 1.25 g of ammonium persulfate (APS) as initiator were introduced. Pressure was maintained at a set-point of 20 bar by continuous feeding of a gaseous mixture of vinylidene fluoride (VDF) (78.5% by moles) and hexafluoropropylene (HFP) (21.5% by moles) up to a total of 2000 g. Moreover, 0.86 g of $CH_2$=$CH$—$(CF_2)_6$—$CH$=$CH_2$, fed in 20 equivalent portions each 5% increase in conversion, were introduced. Once 2000 g of monomer mixture were fed to the reactor, the reaction was discontinued by cooling the reactor to room temperature. The residual pressure was then released, reactor vented and then the temperature brought again to 80° C. VDF was then fed into the autoclave up to a pressure of 20 bar, and 0.14 g of ammonium persulfate (APS) as initiator were introduced. Pressure was maintained at a set-point of 20 bar by continuous feeding of VDF up to a total of 500 g. Then, the reactor was cooled, vented and the latex recovered. The latex was treated with aluminum sulphate to effect coagulation, the coagulate so formed was separated from the aqueous phase, washed with demineralized water and dried in a convection oven at 90° C. for 16 hours. Characterization data of the polymer so obtained are summarized in Table 1.

TABLE 1

|  |  | Ex. 5C | Ex. 6C |
|---|---|---|---|
| DSC | | | |
| $T_g$ | [° C.] | −20.5 | −21.5 |
| $T_m$ | [° C.] | 202 | 162.5 |

TABLE 1-continued

|  |  | Ex. 5C |  | Ex. 6C |  |
|---|---|---|---|---|---|
| $\Delta H_{XX}$ | [J/g] | 5.9 |  | n.d. |  |
| Composition - NMR |  | soft (A) | $F_{(A)}$ | soft (A) | $F_{(A)}$ |
| VDF | [% mol] | 78.5 | 0.80 | 78.5 | 0.80 |
| HFP | [% mol] | 21.5 |  | 21.5 |  |
| Composition |  | hard (B)(*) | $F_{(B)}$ | hard (B)(**) | $F_{(B)}$ |
| Et | [% mol] | 46 | 0.20 | 0 | 0.20 |
| CTFE | [% mol] | 54 |  | 0 |  |
| VDF | [% mol] | 0 |  | 100 |  |
| Sealing Properties |  |  |  |  |  |
| C-set @ 23° C. | % 24 h | 19 |  | 45 |  |
| C-set @ 70° C. | % 24 h | 47 |  | 73 |  |

(*)determined notably by elemental analysis, including through determination of chlorine content;
(**)determined by NMR analysis.

The invention claimed is:

1. A fluorinated thermoplastic elastomer [polymer (F-TPE)] consisting of:
   at least one elastomeric block (A) consisting of a sequence of recurring units, said sequence consisting of recurring units derived from at least one fluorinated monomer and optionally recurring units derived from at least one bis-olefin [bisolefin (OF)] of formula:

$$R_A R_B C = CR_C - T - CR_D = CR_E R_F$$

wherein $R_A$, $R_B$, $R_C$, $R_D$, $R_E$ and $R_F$, equal to or different from each other, are selected from the group consisting of H, F, Cl, $C_1$-$C_5$ alkyl groups and $C_1$-$C_5$ (per)fluoroalkyl groups, and T is a linear or branched $C_1$-$C_{18}$ alkylene or cycloalkylene group, optionally comprising one or more than one ethereal oxygen atom,
   said block (A) possessing a glass transition temperature of less than 25° C., as determined according to ASTM D3418,
   wherein the fluorinated monomer of elastomeric block (A) is selected from the group consisting of:
   (a) $C_2$-$C_8$ perfluoroolefins;
   (b) hydrogen-containing $C_2$-$C_8$ fluoroolefins;
   (c) $C_2$-$C_8$ chloro- and/or bromo-containing fluoroolefins; and
   (d) (per)fluorodioxoles of formula:

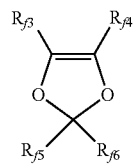

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, and
   at least one thermoplastic block (B) consisting of a sequence of recurring units, said sequence of recurring units having at least 99% of moles derived from chlorotrifluoroethylene, and
   wherein the fluorinated thermoplastic elastomer is a block copolymer comprising a central block (A) having two ends, connected at each end to a side block (B), thus forming a (B)-(A)-(B) structure, and
   wherein the weight ratio between blocks (A) and blocks (B) in the fluorinated thermoplastic elastomer is comprised between 95:5 and 10:90.

2. The fluorinated thermoplastic elastomer of claim 1, which comprises:
   at least one elastomeric block (A) selected from the group consisting of:
   (1) vinylidene fluoride (VDF)-based elastomeric blocks ($A_{VDF}$) consisting of a sequence of recurring units, said sequence comprising recurring units derived from VDF and recurring units derived from at least one fluorinated monomer different from VDF; and
   (2) tetrafluoroethylene (TFE)-based elastomeric blocks ($A_{TFE}$) consisting of a sequence of recurring units, said sequence comprising recurring units derived from TFE and recurring units derived from at least one fluorinated monomer different from TFE; and
   at least one thermoplastic block (B) consisting of a sequence of recurring units, said sequence of recurring units having at least 99% of moles derived from chlorotrifluoroethylene.

3. The fluorinated thermoplastic elastomer of claim 2, which comprises:
   at least one elastomeric block (A) selected from the group consisting of:
   (1) vinylidene fluoride (VDF)-based elastomeric blocks ($A_{VDF}$) consisting of a sequence of recurring units, said sequence comprising recurring units derived from VDF and recurring units derived from at least one fluorinated monomer different from VDF, said fluorinated monomer different from VDF being selected from the group consisting of:
   (a) $C_2$-$C_8$ perfluoroolefins;
   (b) hydrogen-containing $C_2$-$C_8$ fluoroolefins different from VDF;
   (c) $C_2$-$C_8$ chloro- and/or bromo-containing fluoroolefins; and
   (d) perfluorooxyalkylvinylethers of formula:

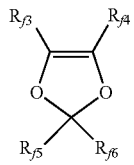

wherein each of $R_{f3}$, $R_{f4}$, $R_{f5}$ and $R_{f6}$, equal to or different from each other, is independently a fluorine atom or a $C_1$-$C_6$ perfluoro(oxy)alkyl group, optionally comprising one or more oxygen atoms; and
   (2) tetrafluoroethylene (TFE)-based elastomeric blocks (AWE) consisting of a sequence of recurring units, said sequence comprising recurring units derived from TFE and recurring units derived from at least one fluorinated monomer different from TFE, said fluorinated monomer different from TFE being selected from the group consisting of those of classes (b), (c), (d), and (e) as defined above; and
   at least one thermoplastic block (B) consisting of a sequence of recurring units, said sequence of recurring units having at least 99% of moles derived from chlorotrifluoroethylene.

4. The fluorinated thermoplastic elastomer of claim 3, which consists of:
at least one elastomeric block (A) selected from the group consisting of:
(1) vinylidene fluoride (VDF)-based elastomeric blocks ($A_{VDF}$) consisting of a sequence of recurring units, said sequence comprising recurring units derived from VDF and recurring units derived from at least one fluorinated monomer different from VDF, said fluorinated monomer different from VDF being selected from the group consisting of:
(a) tetrafluoroethylene (TFE), hexafluoropropylene (HFP);
(b) vinyl fluoride, trifluoroethylene (TrFE), hexafluoroisobutylene (HFIB), perfluoroalkyl ethylenes of formula $CH_2=CH-R_{f1}$, wherein $R_{f1}$ is a $C_1$-$C_6$ perfluoroalkyl group;
(c) chlorotrifluoroethylene (CTFE); and
(d) perfluoromethoxyalkylvinylethers of formula:

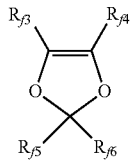

wherein each of $R_{f3}$, $R_{f4}$, $R_{f5}$ and $R_{f6}$, equal to or different from each other, is independently —F, —$CF_3$, —$C_2F_5$, —$C_3F_7$, —$OCF_3$ or —$OCF_2CF_2OCF_3$; and
(2) tetrafluoroethylene (TFE)-based elastomeric blocks (AWE) consisting of a sequence of recurring units, said sequence comprising recurring units derived from TFE and recurring units derived from at least one fluorinated monomer different from TFE, said fluorinated monomer being selected from the group consisting of those of classes (b), (c), (d), and (e) as defined above; and
at least one thermoplastic block (B) consisting of a sequence of recurring units, said sequence of recurring units having at least 99% of moles derived from chlorotrifluoroethylene.

5. The fluorinated thermoplastic elastomer of claim 1, wherein the fluorinated monomer of elastomeric block (A) is selected from the group consisting of:
(a) tetrafluoroethylene (TFE), hexafluoropropylene (HFP), perfluoroisobutylene;
(b) vinylidene fluoride (VDF), vinyl fluoride, trifluoroethylene (TrFE), hexafluoroisobutylene (HFIB), perfluoroalkyl ethylenes of formula $CH_2=CH-R_{f1}$, wherein $R_{f1}$ is a $C_1$-$C_6$ perfluoroalkyl group;
(c) chlorotrifluoroethylene (CTFE); and
(d) (per)fluorodioxoles of formula:

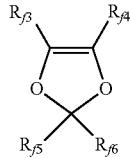

wherein each of $R_{f3}$, $R_{f4}$, $R_{f5}$ and $R_{f6}$, equal to or different from each other, is independently —F, —$CF_3$, —$C_2F_5$, —$C_3F_7$, —$OCF_3$ or —$OCF_2CF_2OCF_3$.

6. The fluorinated thermoplastic elastomer of claim 1, wherein the weight ratio between blocks (A) and blocks (B) in the fluorinated thermoplastic elastomer is comprised between 50:50 and 85:15.

7. A method for manufacturing the fluorinated thermoplastic elastomer of claim 1, said method comprising the following sequential steps:
(a) emulsion-polymerizing at least one fluorinated monomer, and optionally at least one bis-olefin (OF), in an aqueous medium in the presence of a radical initiator and of an iodinated chain transfer agent, thereby providing a pre-polymer consisting of at least one block (A) containing one or more iodinated end groups dispersed in an aqueous medium; and
(b) emulsion-polymerizing chlorotrifluoroethylene (CTFE), in the presence of a radical initiator and in the presence of the pre-polymer dispersed in the said aqueous medium as obtained from step (a), thereby providing at least one block (B) grafted on said pre-polymer through reaction of the said iodinated end groups of the block (A).

8. A composition (C) comprising the polymer (F-TPE) according to claim 1, in combination with at least one additional component.

9. A composition (C) according to claim 8, wherein the at least one additional component is selected from the group consisting of reinforcing agents, pigments, processing aids, plasticizers, stabilizers, acid scavengers, mold release agents, and curing systems.

10. A method for manufacturing a shaped article, said method comprising moulding polymer (F-TPE) according to claim 1 so as to provide said shaped article.

11. The method of claim 10, wherein moulding is achieved by at least one of compression moulding, extrusion moulding, injection moulding, transfer moulding.

12. The method of claim 11, said method including a step of machining of a standard shaped part so as to obtain the targeted shaped article having different size and shape from said standard shaped part.

13. A shaped article made from polymer (F-TPE) according to claim 1.

* * * * *